United States Patent Office 3,660,487
Patented May 2, 1972

3,660,487
N-(ALKYL) ALKANESULFONAMIDOPHEN-
ETHANOLAMINES
Aubrey A. Larsen and Robert H. Uloth, Evansville, Ind.,
assignors to Mead Johnson & Company, Evansville,
Ind.
No Drawing. Filed Oct. 2, 1969, Ser. No. 863,388
Int. Cl. C07c 143/74
U.S. Cl. 260—556 A                          27 Claims

ABSTRACT OF THE DISCLOSURE

A new class of sympatholytic phenethanolamines with N-(alkyl)alkanesulfonamido and hydroxy aromatic substituents has been synthesized. The substances are pharmacologically active adrenergic blocking agents. A preferred compound is 2'-hydroxy-5'-[1-hydroxy-2-(1-phenoxy - 2 - propylamino)propyl]-N-methylmethanesulfonanilide which effectively suppresses both alpha and beta adrenergic stimulation.

BACKGROUND OF INVENTION (1) Field of the invention

This invention pertains to N-(alkyl)alkanesulfonamidophenethanolamine compounds which affect mammalian sympathetic nervous systems. More specifically, products of this invention oppose the effects of adrenergic stimulatory agents such as epinephrine, norepinephrine, and isoproterenol.

(2) Description of the prior art

In the field of adrenergic agents it is desirable to have drugs which will block, that is antagonize the effects of adrenergic stimulation, as well as to produce adrenergic effects in mammals. Adrenergic stimulation, for example, is deleterious to certain disease states such as angina pectoris, cardiac arrhythmia, hypertension, and pheochromocytoma. Compounds which have been clinically effective in treating the foregoing disease states have the property of being adrenergic neuroeffector transmission. Phenethanolamines bearing hydroxy and alkanesulfonamido aromatic substituents have been found by Larsen et al., [J. Med. Chem. 10, 462 (1967)], to be potent and selective adrenergic stimulants with no beta-adrenergic blocking activity.

SUMMARY OF THE INVENTION

We have discovered a group of compounds comprised of N-(alkyl)alkanesulfonamidophenethanolamines which possess a unique combination of adrenergic blocking properties as demonstrated by their action on the isolated smooth muscle mammalian tissue. It has been discovered that phenethanolamines bearing hydroxy and N-(alkyl)-alkanesulfonamido functionalities unexpectedly block beta-adrenergic activity while the corresponding phenethanolamine (Larsen et al., supra) wherein the sulfonamido group is not alkylated are beta-adrenergic stimulants. Certain compounds of the present invention exhibit both alpha and beta adrenergic blocking properties; a combination of adrenergic blocking action unique in the field of adrenergic acting phenethanolamines. Although various classes of substituted phenethanolamines have combinations of adrenergic stimulant and adrenergic blocking actions, none of the heretofore known adrenergic agents have the ability to simultaneously block the actions of both alpha and beta adrenergic stimulation to any significant degree.

TECHNICAL DISCLOSURE OF THE INVENTION

The present invention relates to new compositions of matter of Formula I and includes the pharmaceutically acceptable acid addition salts thereof.

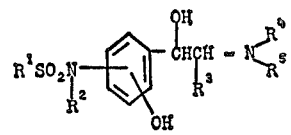

In the above formula the phenolic OH and

groupings may be joined to the aromatic ring in any of the 3, 4, and 5 positions relative to the aminoethanol side chain represented by the symbol

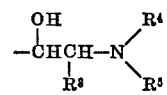

The $R^1$ and $R^2$ substituents of the sulfonamido moiety are independently selected from branched or straight chain lower alkyl groups of up to 4 carbon atoms. The $R^3$ substituent may be hydrogen or lower alkyl substituents such as methyl, ethyl, propyl and isopropyl. The amino substituent represented by the symbol

hereinafter also represented by $NR^4R^5$ is a nitrogen heterocycle bonded through the nitrogen atom thereof including heteromonocyclic groups containing up to 7 carbon atoms and heterobicyclic groups containing up to 11 carbon atoms. The said heterocyclic groups of the $NR^4R^5$ symbol may contain up to 1 additional heteroatom selected from the group consisting of nitrogen, oxygen, and sulfur. The symbol $NR^4R^5$ also represents an amino group wherein $R^4$ is selected from the group consisting of hydrogen, alkyl up to 10 carbon atoms, benzyl and benzhydryl; and $R^5$ is selected from the group consisting of hydrogen, a hydrocarbon group such as alkyl, alkenyl, cycloalkyl, cycloalkenyl, cycloalkylalkyl, cycloalkenylalkyl, bicycloalkyl, tricycloalkyl, bicycloalkenyl, bicycloalkylalkyl, bicycloalkenylalkyl, aryl, phenylalkyl, phenylalkenyl, phenoxyalkyl, or a heteromonocyclic, heteromonocycloalkyl, and heterobicyclic group each of said hydrocarbon groups contain no more than 12 carbon atoms and has zero to two substituents selected from the group consisting of hydroxyl, carboxyl, amino, lower alkoxy, benzyloxy, halogen, lower alkyl, methylenedioxy; each of said heteromonocyclic, heteromonocycloalkyl and heterobicyclic contains a nitrogen heteroatom and up to one additional heteroatom selected from the group of oxygen, nitrogen and sulfur, and wherein each of said lower alkyl and lower alkoxy groups has up to 4 carbon atoms.

Examples of amines which can comprise the NR⁴R⁵ amino function of the compounds of Formula I are methylamine, 1,1 - diphenylmethylamine, isopropylamine, tert.-butylamine, allylamine, cyclopropylamine, para-methoxyphenethylamine, phenoxyisopropylamine, dimethylamine, morpholine, orthomethoxyphenylpiperazine, 2 - amino-2-methyl-1-propanol, adamantanamine, 2 - norboranamine, para-chlorophenethylamine, alanine, 3 - aminocyclohex-1-ene, thiamorpholine, cyclopropylmethylamine, 1 - (3,4-methylenedioxyphenyl) - 2 - propylamine, 2 - amino-1-methoxypropane, 2 - aminomethylenebicyclo - (2,2,1)-5-heptene, alpha,alpha - dimethylphenethylamine, beta-hydroxyphenethylamine, tert.-octylamine, 3 - phenylallylamine and 3 - indoylisopropylamine.

Chemical synthesis.—The compounds of this invention are prepared by a process involving the unitary concept of introducing the N-alkyl group into an alkanesulfonamidophenone intermediate, the ketone side-chain thereof being an aliphatic group adopted for amino substitution and reduction to an ethanolamine side-chain or a benzhydrylaminophenone.

The following flow-sheet structurally sets forth a preferred sequence of reactions for carrying out this process. Benzyloxy - alkylsulfonamidophenone starting materials (II) for this multi-step process are known to the art and are adequately exemplified in U.S. 3,341,584 and J. Med. Chem., 10, 462 (1967). For example, the phenone intermediate 3'-benzyloxy - 5' - acetylmethanesulfonanilide is prepared from the 3'-benzyloxy-5'-nitrobenzoyl chloride via the ethoxy magnesium malonic ester synthesis of ketones.

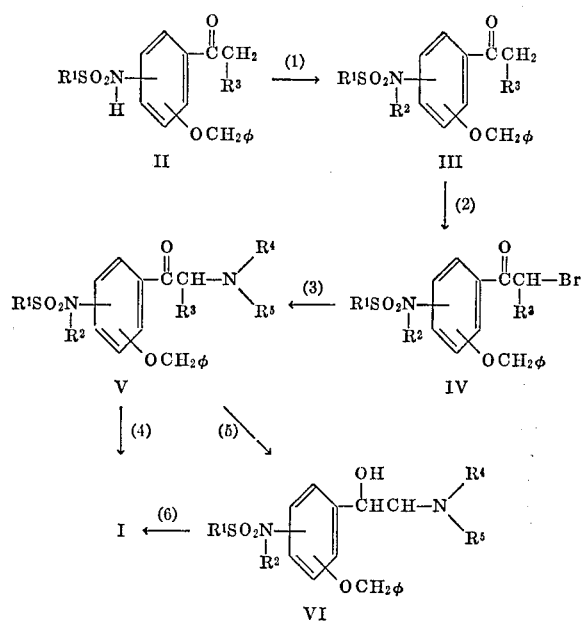

The sulfonamido group in Step 1 is alkylated by reacting an alkali-metal salt of the phenone (II) with a compound having the formula $R^2X$ wherein $R^2$ is as previously defined and X is a reactive ester group such as chlotosylate. Methyl iodide is a convenient and preferred alkylating agent. Other suitable alkylating agents can also be used and include dimethylsulfate, trimethylphosphate, and methyltosylate. Generally the reaction is carried out in a diluent comprising inert organic liquids which include protic as well as aprotic solvents. Ethanol is particularly preferred as a reaction medium. Agents which are suitable for the formation of the alkali metal salt of the benzyloxyacetylsulfonanilide include potassium hydroxide, sodium hydroxide, lithium hydroxide, sodium amide, lithium amide, sodium hdride, butyl lithium, phen-1 lithium, potassium t.-butoxide and the like.

In addition to alkylating phenones of Formula II where the alkanesulfonamido group is unequivocally alkylated, selected alkylation of an alkanesulfonamido group of a sulfonamidoaminophenone is also possible. These alkylations can be represented by the following equation wherein $R^1$, $R^2$, $R^3$ and X groups have been previously defined and R'' is hydrogen or benzhydrylamino, and M is an alkali-metal.

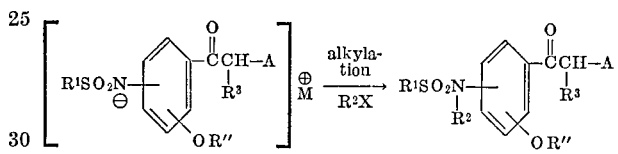

Thus, for example, alkylation of the sodium salt of 2'-benzyloxy - 5' - [2-(diphenylmethylamino)propionyl] methanesulfonanilide with methyl iodide yields 2-benzyloxy-5'-[2 - (diphenylmethylamino)propionyl]-N-methylmethanesulfonanilide.

In Step 2 the benzyloxy-acylsulfonanilides of Formula III are brominated to provide the phenacyl bromide intermediates of Formula IV. Chlorinated hydrocarbon solvents are particularly useful vehicles for this bromination procedure. Other suitable solvents are dioxane, benzene, and diethylether. The bromination can be carried out at temperatures ranging from about —10° C. to 80° C. A temperature of —5° C. to 10° C. is preferred since in some instances the benzyloxy ether group is sensitive to cleavage at higher temperatures by the hydrogen bromide by-product.

Amino ketone intermediates of Formula V are obtained in Step 3 by condensation of primary or secondary amines with phenacyl bromides of Formula IV. Although it is preferred to carry out this condensation in acetonitrile, both aprotic and protic solvents are useful as reaction media. Intermediates of Formula V may be used without purification in Step 4 or purified by standard methods known to the art.

The amino ketones of Formula V are converted to the compounds (I) of the present invention with suitable reducing agents. To illustrate, catalytic hydrogenation of a ketone of Formula V in Step 4 results in reduction of the carbonyl group to the carbinol of Formula I and concomitant debenzylation of a N-benzyl or N-benzhydryl amino function along with cleavage of the benzyloxy ether grouping. Palladium-on-carbon is a preferred catalyst for effecting this reduction although other reducing catalysts such as platinum-on-carbon and Raney nickel may be used.

When reduction of the carbonyl of Formula V amino ketones to a carbinol is carried out by chemical reducing agents, such as sodium borohydride, potassium borohydride and lithium aluminum hydride, a benzyloxy sulfonamidophenethanolamine of Formula VI is obtained. The final conversion of this benzyloxy intermediate (VI) to the substances of the present invention is brought about by catalytic hydrogenation employing aforementioned catalysts. Catalytic reductions are performed in the usual manner, for instance at temperatures of about 0 to 100° C. in alcoholic solution.

Hydroxy-N-(alkyl)alkanesulfonamidophenones, which are prepared by debenzylating the sulfonamidophenone intermediates of Formula III, can also be employed as starting materials in a variation of the above scheme to provide the substances of the present invention. The cleavage of the benzyloxy ether group of Formula III intermediates is accomplished by treating the phenone substrate with an ether-splitting agent such as hydrogen bromide in anhydrous glacial acid, constant boiling hydrobromic acid or reduction catalytically with a palladium-on-carbon catalyst.

Another variation of the above scheme, which provides products of this invention, is to reductively alkylate N-(alkyl) alkanesulfonamidophenethanolamines of Formula I wherein $R^4$ and $R^5$ are hydrogen with an aldehyde or ketone. The carbonyl containing group of the aldehyde or ketone is related in structure to the $R^5$ substituent of the product in that the carbonyl carbon corresponds to the carbon atoms to which the nitrogen atom of the amino function is attached.

An example of this reductive alkylation procedure is the preparation of 2'-hydroxy-5'-[1-hydroxy-2-(1-phenoxy-2-propylamino)propyl] - N-methylmethanesulfonanilide one of the preferred embodiments of the present invention as follows; the primary amino alcohol 2'-hydroxy-5'-(2-amino-1-hydroxy-propyl) - N-methylmethanesulfonanilide is reductively alkylated with phenoxy-2-propanone employing a platinum oxide catalyst in an atmosphere of hydrogen. The primary amino alcohol intermediate is prepared according to the sequence of reactions illustrated in the flow-sheet or alternately by a procedure which consists of a selected N-methyl alkylation of the methanesulfonamido group of 2'-benzyloxy-5'-[2-(diphenylmethylamino)propionyl]methanesulfonanilide. Catalytic reduction employing a palladium-on-charcoal catalyst, of the 2'-benzyloxy-5'-[2-(diphenylmethylamino)propionyl] - N-methylmethanesulfonanilide yields the 2'-hydroxy-5'-(2-amino-1-hydroxypropyl) - N - methylmethanesulfonanilide primary amino substrate used in the preparation of said preferred compound.

Other variations in the hereinabove described procedures for the preparation of compounds of Formula I will be apparent to those skilled in the art and are considered to be within the purview of this invention.

It will be readily apparent to those skilled in the art that compounds of the present invention exist as stereoisomers since the carbinol group of Formula I is an asymmetric carbon atom. Therefore, at least two enantiomorphic forms of the phenethanolamine products exist. Where there is a second asymmetric center, as is the case where $R^3$ is alkyl, products of the present invention exist in at least two racemic modification forms. If the $NR^4R^5$ amino substituent contains an additional asymmetric grouping, there will be additional racemic forms of the product. It is to be understood that all stereoisomeric forms of the substances of Formula I are included within the scope of the present invention. The racemate mixtures may be separated into the individual racemic compounds on the basis of such physico-chemical differences as solubility, for example by fractional crystallization. The optically active dextrorotatory and leveorotatory forms of the compounds of this invention are obtained by dissolving the racemic forms according to procedures known to the art relating to resolution of phenethanolamines. For example, acid addition salts with optically active acids such as d-tartaric acid, dibenzyoyl-d-tartaric acid, 1-malic acid, d-camphorsulfonic acid, d-mandelic acid are useful for effecting resolution of enantiomorphic pairs of the present compounds and are considered part of this invention.

Compounds of the present invention are pharmacologically useful either in the free base form or in the acid addition salt form. The hydrochloride addition salts of compounds of Formula I are particularly useful. Other appropriate non-toxic pharmaceutically acceptable salts within the purview of the invention are those derived from mineral acids such as hydrobromic, hydriodic, nitric, phosphoric, sulfamic and sulfuric acid. Representative organic acids which may be used as salt forming agents are acetic, tartaric, lactic, methanesulfonic, paratoluenesulfonic and mucic acid. Preparation of acid addition salts is accomplished in conventional fashion by treating one of the compounds of the present invention in an organic solvent, for example ethaol, benzene, ether, chloroform, etc., with the acid. The salt separates directly or can be obtained by concentrating the solution.

Pharmacologic evaluation.—Drugs which affect the mammalian sympathetic (adrenergic) nervous system are classified as having alpha and beta adrenergic action depending upon the response induced in isolated smooth muscle tissue [R. P. Ahlquist, Am. J. Physiol., 153, 586 (1948)]. If a compound, for example, produces relaxation in such in vitro mammalian smooth muscle test preparations as the uterine horn of the diestrus rat or the guinea pig tracheal spiral, it is said to be a beta-adrenergic stimulant or agonist. On the other hand, if a compound decreases the response of a beta-agonist, such as isoproterenol in the guinea pig test preparation, it is considered to be a beta-adrenergic blocking agent or antagonist. The methodology of the hereinabove smooth muscle tests has been described by P. M. Lish, J. H. Weikel, and K. W. Dungan in the Journal of Pharmacology and Experimental Therapeutics, 149, 161, (1965). These in vitro test methods consist of immersing the uterine horn from the diestrus rat or the tracheal spiral from the guinea pig in Tyrode solution at 38° C. and recording the activity isotonically by attachment of the smooth muscle to a weighted gravity lever writing on a smoked drum; the median effective dose of the test agent eliciting a 50% response is interpolated from log concentration response curves. The beta-agonist activity of the test drug in the rat uterus screen is recorded as the concentration required to reduce by 50% the spontaneous contraction of the rat uterus. In the guinea pig trachea screen for beta-adrenergic blockade, the concentration required to inhibit by 50% the relaxant action of isoproterenol administered at a dose of 0.01 microgram per milliliter is obtained. Gifty percent inhibitory concentration values for a number of the compounds of the present invention are given in Table I. For comparison, results for corresponding compounds of the prior art wherein the sulfonamido substituents are not alkylated are also shown.

TABLE I

Beta adrenergic effects of N-(alkyl)-alkane sulfonamidophenethanolamines and alkanesulfonamidophenethanolamines

| Test drug [2] | β-Stimulation, rat uterus $IC_{50}$, μg./ml. | β-Block, guinea pig trachea $IC_{50}$, μg./ml. |
|---|---|---|
| A | >1,000 | 14.3 |
| B | 100 | 250.0 |
| C | 0.06 | [1] N.D.A. |
| D | 9 | 6.5 |
| E | 0.015 | N.D.A. |
| F | 5.8 | 5.45 |
| G | 0.0008 | >200.0 |
| H | 170 | 3.9 |
| I | 0.0002 | N.D.A. |
| J | 0.07 | 1.3 |
| K | 0.0003 | N.D.A. |
| L | 0.04 | 3.57 |
| M | 0.03 | 2.3 |
| N | 0.0004 | N.D.A. |
| O | 150 | 1.9 |
| P | 0.0014 | N.D.A. |

See footnotes at bottom of column 7.

The N-(alkyl)alkanesulfonamidophenethanolamines of Formula I comprise a group of adrenergic agents which possess beta-adrenergic blocking action and in some instances alpha-adrenergic blocking action in mammals.

One embodiment of this invention is the discovery that phenethanolamines which bear N-(alkyl)alkanesulfonamido and hydroxy ring substitutents have potent adrenergic beta-blocking properties in mammals. These properties are highly unexpected in view of the potent adrenergic beta stimulant activity of the correspondingly substituted non-alkylated phenethanolamines disclosed in U.S. Pat. No. 3,341,584. We have found, in other words, that N-alkylation of certain sulfonamidophenethanolamines cited in U.S. Pat. No. 3,341,584 provides compounds which are beta-adrenergic blocking agents. This discovery is illustrated in Table I wherein the beta-adrenergic activities of representative N-(alkyl)alkanesulfonamidophenethanolamines of this invention are compared with unalkylated alkanesulfonamidophenethanolamines species of U.S. Patent No. 3,341,584. The biological data clearly demonstrates that compounds of the present invention are beta adrenergic blocking agents in contrast to the referenced (U.S. Pat. No. 3,341,584) phenethanolamines which have beta adrenergic stimulant activity. For example 2'-hydroxy-5'-[1-hydroxy-2-(1-phenoxy - 2 - propylamino)propyl]-N-methylmethanesulfonanilide, one of the preferred compounds of the present invention, is a potent beta adrenergic blocking agent with an $IC_{50}$ of 1.9 micrograms per milliliter as demonstrated in the guinea pig trachea tissue. In this test the corresponding unalkylated compound, 2'-hydroxy-5'-[1-hydroxy-2-(1-phenoxy-2-propylamino)propyl]methanesulfonanilide, is completely inactive as a beta adrenergic blocking agent.

1 No demonstrable activity.
2 Chemical names of the test drugs and references related thereto are:

| Test drug | Chemical names | Reference |
|---|---|---|
| A | 2'-hydroxy-5'-[1-hydroxy-2-(methylamino)ethyl]-N-methylmethanesulfonanilide hydrochloride. | Table III Ex. No. 4. |
| B | 2'-hydroxy-4'-(1-hydroxy-2-methylaminoethyl)-N-methylmethanesulfonanilide hydrochloride. | Table III Ex. No. 1. |
| C | 2'-hydroxy-5'-[1-hydroxy-2-(methylamino)ethyl]methanesulfonanilide hydrochloride. | U.S. Patent No. 3,341,584. |
| D | 2'-hydroxy-5'-[1-hydroxy-2-(methylamino)propyl]-N-methylmethanesulfonanilide hydrochloride. | Table III Ex. No. 6. |
| E | 2'-hydroxy-5'-(1-hydroxy-2-methylaminopropyl)methanesulfonanilide hydrochloride. | U.S. Patent No. 3,341,584. |
| F | 2'-hydroxy-5'-[1-hydroxy-2-(isopropylamino)propyl]-N-methylmethanesulfonanilide hydrochloride p-toluenesulfonate. | Table III Ex. No. 7. |
| G | 2'-hydroxy-5'-(1-hydroxy-2-isopropylaminopropyl)methanesulfonanilide hydrochloride. | U.S. Patent No. 3,341,584. |
| H | 2'-hydroxy-5'-[1-hydroxy-2-(phenethylamino)ethyl]-N-methylmethanesulfonanilide hydrochloride. | Table III Ex. No. 15. |
| I | 2'-hydroxy-5'-(1-hydroxy-2-phenethylaminoethyl)methanesulfonanilide hydrochloride. | U.S. Patent No. 3,341,584. |
| J | 2'-hydroxy-5'-[1-hydroxy-2-(phenethylamino)propyl]-N-methylmethanesulfonanilide hydrochloride. | Table III Ex. No. 16. |
| K | 2'-hydroxy-5'-(1-hydroxy-2-phenethylaminopropyl)methanesulfonanilide hydrochloride. | U.S. Patent No. 3,341,584. |
| L | 2'-hydroxy-5'-[1-hydroxy-2-(p-methoxyphenethylamino)ethyl]-N-methylmethanesulfonanilide hydrochloride. | Table III Ex. No. 18. |
| M | 2'-hydroxy-5'-[1-hydroxy-2-(p-methoxyphenethylamino)propyl]-N-methylmethanesulfonanilide hydrochloride. | Table III Ex. No. 19. |
| N | 2'-hydroxy-5'-[1-hydroxy-2-(4-methoxyphenethylamino)propyl]-methanesulfonanilide hydrochloride. | U.S. Patent No. 3,341,584. |
| O | 2'-hydroxy-5'-[1-hydroxy-2-(1-phenoxy-2-propylamino)propyl]-N-methylmethanesulfonanilide hydrochloride. | Table III Ex. No. 20. |
| P | 2'-hydroxy-5'-[1-hydroxy-2-(1-phenoxy-2-propylamino)propyl]-methanesulfonanilide hydroxhloride. | U.S. Patent No. 3,341,584. |

Another embodiment of this invention is the discovery that a number of the preferred compounds have strong beta-adrenergic blocking action with accompanying alpha-adrenergic blocking action in a mammalian host which is a unique and highly desirable combination of biological properties. Drugs having beta-adrenergic blocking action or a combination of dual adrenergic blocking action are desired for prophylactic treatment of heart diseases such as angina pectoris and cardiac arrhythmias and in the treatment of hypertension and pheochromocytoma.

A particularly preferred compound which is representative of the biological spectrum of activity of the compounds of the present invention is 2'-hydroxy-5'-[1-hydroxy-2-(1-phenoxy - 2 - propylamino)propyl]-N-methylmethanesulfonanilide hydrochloride which has strong beta-adrenergic blocking action as well as potent alpha blocking action. This compound when administered intravenously to an anesthetized dog at a dose of 1 mg./kg. body weight produces a 37% reduction in blood pressure.

Compounds of the present invention can be prepared in various types of dosage unit formulations including tablets, capsules, elixirs, solutions, suspensions, ointments, etc., using various types of excipients, preservatives, tablet lubricants, and carriers including both solids and liquids such as corn starch, lactose, calcium phosphate, stearic acid, polyethylene glycol, water, sesame seed oil, peanut oil, propylene glycol, etc. They may be administered orally or parenterally to a mammalian host for the purpose of exerting an adrenergic blocking action on the smooth muscle tissue of said host in doses ranging from 20 micrograms per kilogram body weight to 50 milligrams per kilogram body weight.

Pharmaceutical formulations of the present invention may be compounded with one of the novel N-(alkyl)alkanesulfonamidophenethanolamines disclosed and claimed herein as the sole active ingredient or they may include other additional active ingredients, including tranquilizers, sedatives, analeptics, analgesics, antipyretics, hypnotics, antibiotics, such as polymixin, tyrothrycin grammacidin, tyrocidin, and neomycin, antihistamines such as chloroprophenpyridamine maleate or methdilazine hydrochloride, antiinflammatory agents such as cortisone phosprate, a surfactant, a chemical antiseptic such as thimerasol, benzalkonium chloride, or a mucolytic agent such as tyloxypal.

DESCRIPTION OF THE PREFERRED EMBODIMENTS

The following procedures illustrate the synthesis of preferred compounds of the present invention without limiting the preparation thereof.

Procedure 1. 3'-benzyloxy-5'-nitroacetophenone

The benzyloxy ether of 3-hydroxy-5-nitrobenzoic acid [J. Am. Chem. Soc., 77, 4059 (1955)] is prepared according to the method described in J. Med. Chem., 10, 462 (1967). Treatment of this material with thionyl chloride provides 3-benzyloxy-5-nitrobenzoyl chloride M.P. 83–85° C.

*Analysis.*—Calcd. for $C_{14}H_{10}ClNO_4$ (percent): C, 57.64; H, 3.46; N, 4.80; Cl, 12.16. Found (percent): C, 57.72; H, 3.73; N, 5.03; Cl, 12.28.

Diethylmalonate (104 g., 0.65 mole) in absolute ethanol (65 ml.) and anhydrous ether (100 ml.) is added to a mixture of magnesium turnings (15.8 g., 0.65 mole), 1 ml. chloroform and 17 ml. of absolute ethanol under nitrogen at such a rate that reflux is maintained. The mixture is stirred and refluxed for 4 hrs. providing almost complete solution of the magnesium. A solution of 3-benzyloxy-5-nitrobenzoyl chloride (164 g., 0.57 mole) in 4 liters of anhydrous ethyl is added to the ethoxymagnesium malonate ethyl ester solution in 45 min. while reflux is maintained. The reaction mixture is refluxed for 3 hrs. and then stirred at room temperature overnight. After about 1 liter of ether is distilled off, the mixture is acidified with 70 ml. of concentrated surfuric acid in 500 ml. of water. The aqueous layer is separated from the ether fraction and washed with two 300 ml. portions of ether. The combined ether extracts are washed first with water, dried over magnesium sulfate, then concentrated to an oil. The oil refluxed in a mixture of 173 ml. of glacial acetic acid, 22 ml. of concentrated sulfuric acid, and 135 ml. of water for 20 hrs. and then made basic with 40% aqueous sodium hydroxide provides the acetophenone; weight 121 g. (80%), M.P. 85.5–87.5° C.

Analysis.—Calcd. for $C_{15}H_{13}NO_4$ (percent): C, 66.41; H, 4.83; N, 5.16. Found (percent). C, 66.24; H, 5.00; N, 4.95.

Procedure 2.—3'-benzyloxy-5'-methanesulfonamidoacetophenone

A suspension of 3'-benzyloxy-5'-nitroacetophenone (54.3 g., 0.2 mole) in 300 ml. of absolute ethanol is reduced in an atmosphere of hydrogen employing 1.2 g. of platinum oxide catalyst. When the calculated quantity of hydrogen is absorbed, the catalyst is collected and the filtrate is concentrated in vacuo. Trituration of the residue with petroleum ether (B.P. 30–60° C.) provides 45.1 g. (93.5%) of 3'-amino-5'-benzyloxyacetophenone, M.P. 85–88° C.

Methanesulfonyl chloride (21.6, 0.19 mole) is added dropwise to a solution of 3'-amino-5'-benzyloxyacetophenone (45.1 g., 0.19 mole) in 150 ml. pyridine while a temperature of 10° C. is maintained. The mixture is stirred for 2 hrs. at room temperature than poured into 1 liter of water and acidified with concentrated hydrochloric acid; yield 56 g. (94%), M.P. 109–113.5° C. This material dissolved in 2.5 N sodium hydroxide, treated with activated charcoal, and added slowly to 6 N hydrochloric acid provides 54 g. (91%) of analytically pure ketone, M.P. 110–113.5° C.

Analysis.—Calcd. for $C_{16}H_{17}NO_4S$ (percent): C, 60.17; H, 5.37; N, 4.39; S, 10.04. Found (percent): C, 60.45; H, 5.37; N, 4.39; S, 9.95.

Procedure 3.—2'-benzyloxy-5'-propionyl-N-methylmethanesulfonanilide

Sodium hydroxide pellets (1.65 g., 0.04 mole) are added to 2'-benzyloxy-5'-propionylmethanesulfonanilide (13.5 g., 0.04 mole) in 225 ml. of absolute ethanol. After stirring the mixture for 1 hr., methyl iodide (11.3 g., 0.08 mole) is added, the mixture stirred for 5 hrs. at room temperature and warmed to 40° C. for 3 hrs. The solvent removed under reduced pressure and the residue triturated first with water and then with 5% aqueous sodium hydroxide provides 11.6 g. (84%) of solid melting at 119–123° C. This material crystallized from 2-propanol (treated with activated charcoal) yields the analytically pure 2' - benzyloxy - 5' - propionyl - N - methylmethanesulfonanilide; weight 10.5 g. (75%), M.P. 119–121° C.

Analysis.—Calcd. (percent): C, 62.22; H, 6.09. Found (percent): C, 62.28; H, 6.27.

By using the appropriate alkyl halide and the above procedure the benzyloxy - N - (alkyl)alkanesulfonamidophenones listed in Table II, Column II, can be prepared from the corresponding benzyloxy sulfonamidophenones Table II, Column I. The phenone substrates, Table II, Column I, are obtained by the methods described in U.S. 3,341,584 and J. Med. Chem., 10, 462 (1967) or by standard methods which are known to those skilled in the art.

TABLE II

Ketone intermediates

| Column I | Column II | Column III |
| --- | --- | --- |
| Benzyloxy-acyl-alkanesulfonanilides | Benzyl-acyl-(N-alkyl)alkanesulfonanilides | Benzyloxy-(2-bromoacyl)-N-(alkyl)-alkanesulfonanilides |
| 2'-benzyloxy-5'-acetylmethanesulfonanilide. | 2'-benzyloxy-5'-acetyl-N-(methyl)-methanesulfonanilide. | 2'-benzyloxy-5'-(2-bromoacetyl)-N-(methyl)-methanesulfonanilide. |
| 2'-benzyloxy-5'-acetylmethanesulfonanilide. | 2'-benzyloxy-5'-acetyl-N-(n-butyl)-methanesulfonanilide. | 2'-benzyloxy-5'-(2-bromoacetyl)-N-(n-butyl)methanesulfonanilide. |
| 2'-benzyloxy-5'-valerylmethane sulfonanilide. | 2'-benzyloxy-5'-valeryl-N-(methyl)-methanesulfonanilide. | 2'-benzyloxy-5'-(2-bromovaleryl)-N-(methyl)methanesulfonanilide. |
| 2'-benzyloxy-5'-butyrylmethanesulfonanilide. | 2'-benzyloxy-5'-butyrul-N-(n-butyl)-methanesulfonanilide. | 2'-benzyloxy-5'-(2-bromobutyryl)-N-(n-butyl)methanesulfonanilide. |
| 2'-benzyloxy-5'-acetylbutanesulfonanilide. | 2'-benzyloxy-5'-acetyl-N-(methyl)-n-butanesulfonanilide. | 2'-benzyloxy-5'-(2-bromoacetyl)-N-(methyl)-n-butanesulfonanilide. |
| 2'-benzyloxy-5'-butyryl-n-butanesulfonanilide. | 2'-benzyloxy-5'-butyryl-N-(methyl)-n-butanesulfonanilide. | 2'-benzyloxy-5'-(2-bromobutyryl)-N-(methyl)-n-butanesulfonanilide. |
| 2'-benzyloxy-4'-acetylmethanesulfonanilide. | 2'-benzyloxy-4'-acetyl-N-(methyl)-methanesulfonanilide. | 2'-benzyloxy-4'-(2-bromoacetyl)-N-(methyl)methanesulfonanilide. |
| 2'-benzyloxy-4'-acetyl-n-butanesulfonanilide. | 2'-benzyloxy-4'-acetyl-N-(methyl)-n-butanesulfonanilide. | 2'-benzyloxy-4'-(2-bromoacetyl)-N-(methyl)-n-butanesulfonanilide. |
| 3'-benzyloxy-5'-acetylmethanesulfonanilide. | 3'-benzyloxy-5'-acetyl-N-(methyl)-methanesulfonanilide. | 3'-benzyloxy-5'-(2-bromoacetyl)-N-(methyl)methanesulfonanilide. |
| 3'-benzyloxy-5'-butyrylmethanesulfonanilide. | 3'-benzyloxy-5'-butyryl-N-(methyl)-methanesulfonanilide. | 3'-benzyloxy-5'-(2-bromobutyryl)-N-(methyl)methanesulfonanilide. |

Procedure 4.—2'-benzyloxy-5'-(2-bromopropionyl)-N-methylmethanesulfonanilide

Bromine (4.8 g., 0.03 mole) is added dropwise at room temperature in 15 min. to a stirred solution of 2'-benzyloxy-5'-propionyl-N-methylmethanesulfonanilide (10.4 g., 0.03 mole) and 0.2 g. of benzoyl peroxide in 100 ml. of methylene dichloride. The reaction mixture is stirred for 0.5 hr. and then washed consecutively with water, saturated aqueous sodium chloride. The washed methylene dichloride solution is dried over magnesium sulfate and then concentrated in vacuo. Crystallization of the residual solid for 2-propanol yields 10.8 g. (83%) of product melting at 132–134° C. An analytical sample (from isopropyl acetate) has a melting point of 134–136° C.

Analysis.—Calcd. (percent): C, 50.71; H, 4.73; Br, 18.75. Found (percent): C, 50.54; H, 4.68; Br. 19.48.

The benzyloxy-(2 - bromoacyl) - N - (alkyl)alkylsulfonanilides listed in Table II, Column III, can be prepared by the above method.

Procedure 5.—Hydroxy-N-(alkyl)alkanesulfonamidophenones

The benzyloxy - N - (alkyl)alkanesulfonamidophenones exemplified in Table I, which are prepared by Procedures 1 to 3, can be used as intermediates for the preparation of hydroxy-N-(alkyl)alkanesulfonamidophenones. Cleavage of the benzyloxy ether of the phenones of Table II can be accomplished by treating them with hydrogen bromide-acetic acid (30% solution of hydrogen bromide in acetic acid), constant boiling hydrobromic acid, hydrogen bromide gas in acetic acid, reduction with a palladium-on-carbon catalyst, reduction employing a nobel metal catalyst in an atmosphere of hydrogen such as palladium-on-carbon and so on.

A preferred method is the treatment of the benzyloxyphenone substrate with a saturated solution of dry hydrogen bromide in acetic acid. After two hours the mixture is quenched in water and the debenzylated product taken up in methylene dichloride. The dried solution (magnesium sulfate) is concentrated in vacuo and the residue consisting of the hydroxy - N - (alkyl)alkanesulfonamidophenone may be purified by crystallization or employed directly as starting material in Procedure 4.

Bromination of a hydroxy - N - (alkyl)alkanesulfonamidophenone carried out according to Procedure 4 in chlorinated hydrocarbon solvents, preferably at a temperature of 0–10° C., yields a hydroxy-(2-bromoacyl)-N-(alkyl)alkanesulfonanilide.

Procedure 6(a).—2' - benzyloxy - 5' - [2' - (para-methoxyphenethylamino)acetyl] - N - methylmethanesulfonanilide hydrochloride 2' - benzyloxy - 5' - (2 - bromoacetyl) - N - methylmethanesulfonanilide (12.4 g., 0.03 mole) is added in portions to p-methoxyphenethylamine (9.1 g., 0.06 mole) in 100 ml. of acetonitrile with stirring and cooling at 0 to 10° C. The mixture is stirred for 1.5 hrs., with continued cooling, after the addition is completed. The insoluble by-product p-methoxyphenethylamine hydrobromide is collected by filtration and washed with 100 ml. of cold acetonitrile. The acetonitrile filtrates are combined, diluted with 1 liter of ether and acidified with ethanolic hydrogen chloride. The precipitated product which forms is collected and washed with ether; weight 12.3 g., M.P. 125–150° C. Crystallization of this material from methanol-isopropyl ether (treated with activated charcoal) yields 5.6 g. of product, M.P. 194–202° C. An analytical sample (from methanol-isopropyl ether) melts at 204–209° C.

Analysis.—Calcd. (percent): C, 60.16; H, 6.02; N, 5.40. Found (percent): C, 59.71; H, 6.37; N, 5.21.

(b) 2'-benzyloxy-5'-[2-(phenethylamino)propionyl]-N-methylmethanesulfonanilide hydrochloride 2' - benzyloxy - 5' - (2 - bromopropionyl) - N - methylmethanesulfonanilide (12.8 g., 0.03 mole) is added in small portions to an acetonitrile solution (60 ml.) of phenethylamine (7.25 g., 0.06 mole) at room temperature. After 2 hrs. the solvent is removed under reduced pressure and the residual oil stirred with 150 ml. of 1 N sodium hydroxide. This mixture is extracted four times with 200 ml. portions of chloroform. The combined chloroform extracts are concentrated in vacuo and the residual oil remaining taken up in the minimal amount of 2-propanol for solution. The 2-propanol solution is acidified with concentrated hydrochloric acid and the solid which precipitates is collected; weight 8.4 g., (66%) M.P. 217–220° C. (dec.) An analytical sample is obtained by crystallizing this material from methanol-isopropyl ether, M.P. 217–219° C. (dec.)

Analysis.—Calcd. (percent): C, 62.07; H, 6.21; N, 5.57; S, 6.37. Found (percent): C, 61.95; H, 5.96; N, 5.42; S, 6.48.

(c) 2' - benzyloxy - 5' - [2 - (N - benzylphenoxyisopropylamino)propionyl] - N - methylmethanesulfonanilide hydrochloride An acetonitrile solution (100 ml.) of 2'-benzyloxy-5'-(2 - bromopropionyl) - N - methylmethanesulfonanilide (21.3 g., 0.05 mole) and N-benzylphenoxyisopropylamine (24.1 g., 0.1 mole) is stirred for 3 hrs. at room temperature, refluxed for 5 hrs. and then stirred at room temperature for an additional 16 hrs. The solvent is removed in vacuo and the residual oil dissolved in 200 ml. of benzene and washed with water until the water wash no longer gives a positive silver nitrate test for halogen. The benzene solution is acidified with ethanolic hydrogen chloride and concentrated in vacuo. The amino ketone is used without further purification in Procedure 8.

Procedure 7.—2' - benzyloxy - 5' - [2 - (diphenylmethylamino)propionyl] - N - methylmethanesulfonanilide hydrochloride To a solution of 73.3 g. (0.2 mole) of 1,1-diphenylmethylamine in 500 ml. of acetonitrile is added to 82.4 g. (0.2 mole) of 2'-benzyloxy-5'-(2-bromopropionyl) methanesulfonanilide [J. Med. Chem., 10, 462 (1967)]. The mixture is refluxed for two hours, chilled and filtered. The filter-cake triturated with 300 ml. of water provides 92 g. (90%) of product melting at 155–165° C. Crystallization of this material from acetonitrile (treated with activated charcoal) yields 76 g. of 2' - benzyloxy - 5'-2 - (diphenylmethylamino)propionyl]methanesulfonanilide base, M.P. 160–190° C. An analytical sample M.P. 162–168° C., is obtained by recrystallization from the same solvent.

Analysis.—Calcd. for $C_{30}H_{30}N_2O_4S$ (percent): C, 70.01; H, 5.88; N, 5.44; S, 6.23. Found (percent): C, 62.73; H, 5.62.

The hydrochloride salt of 2'-benzyloxy-5'-[2-(diphenylmethylamino)propionyl]methanesulfonanilide is prepared by acidifying a methanol solution of the base with ethanolic hydrogen chloride, concentrating the mixture in vacuo and crystallizing the residue from methanol. The analytical sample melts at 191–193° C. (dec.)(corr.)

Analysis.—Calcd. for $C_{30}H_{31}Cl,N_2O_4S$ (percent): C, 65.38; H, 5.67. Found (percent): C, 62.73; H, 5.62.

Methyl iodide, (38.6 g., 0.27 mole) in 100 ml. of ethanol is added to a suspension of 2' - benzyloxy - 5'- [2 - (diphenylmethylamino)propionyl]methanesulfonilide (70.0 g., 0.136 mole) in 2 liters of ethanol. After stirring for 1 hr. sodium hydroxide (5.45 g., 0.136 mole) dissolved in 400 ml. of ethanol is added to the mixture and stirring is continued for 1.5 hrs. when an additional 19.3 g. portion of methyl iodide in 50 ml. of ethanol is added. A temperature of 40° C. is maintained throughout the reaction. The mixture is stirred for 3 hrs. after the final addition of methyl iodide, cooled, and filtered. The filter-cake washed first with ethanol and then water provides 69 g. (96%) of white solid, M.P. 170–173.5° C.

A 4.8 g. portion of this material suspended in 50 ml. of absolute methanol is acidified with ethanolic hydrogen chloride and the mixture heated to reflux. The methanolic solution treated with activated charcoal, filtered, and diluted with 140 ml. of isopropyl ether yields 4.84 g., of 2' - benzyloxy - 5' - [2 - (diphenylmethylamino)propionyl] - N - methylmethanesulfonanilide hydrochloride, M.P. 211–213° C. (dec.) (corr.).

Analysis.—Calcd. for $C_{31}H_{33}Cl,N_2O_4S$ (percent): C, 65.88; H, 5.88; N, 4.96; S, 5.67. Found (percent): C, 66.11; H, 6.11; N, 4.68; S, 5.57.

Procedure 8.—2'-hydroxy-5'-(2-amino-1-hydroxypropyl)-N-methylmethanesulfonanilide hydrochloride A suspension of 2' - benzyloxy - 5' - [2 - (diphenylmethyl amino)propionyl] - N - methylmethanesulfonanilide hydrochloride (11.4 g., 0.02 mole) in 250 ml. of 90% ethanol is hydrogenated on a Parr apparatus employing a 3.5 g. of 10% palladium-on-charcoal catalyst. When the hydrogen uptake ceases the catalyst is collected and the filtrate concentrated in vacuo. The residue stirred and triturated with several portions of ethyl acetate provides on standing a solid, M.P. 167–180° C. The solid is dissolved in 50 ml. of 2-propanol (treated with activated charcoal) and isopropyl ether added until the 2-propanol solution is slightly turbid. On standing the mixture deposits 4.2 g. of solid, M.P. 180–184° C. (dec.) Crystallization from 2-propanol-isopropyl ether yields analytically pure product; weight 3.5 g., M.P. 182–185° C. (dec.)(corr.).

Procedure 9.—Reduction with sodium borohydride

A solution 9.8 g. (0.02 mole) of 2'-benzyloxy-5'-[2-(N - benzylmethylamino)acetyl] - N-methylmethanesulfonanilide hydrochloride in 100 ml. of methanol is treated portionwise with 0.08 of sodium borohydride while the temperature is maintained at 10–20° C. The mixture is stirred for 2 hrs. at room temperature, filtered, acidified with ethanolic hydrogen chloride, and concentrated in vacuo. The product which consists of 2'-benzyloxy-5'-[2-(N - benzylmethylamino) - 1 - hydroxyethyl]-N-methylmethanesulfonanilide hydrochloride, debenzylated by Procedure 8 provides 2'-hydroxy-5'-[1-hydroxy-2-(methylamino)ethyl] - N - methylmethanesulfonanilide hydrochloride.

Procedure 10.—2'-hydroxy-5'-[1-hydroxy - 2 - (1-phenoxy - 2 - propylamino)propyl]-N-methylmethanesulfonanilide hydrochloride An absolute ethanol solution (200 ml.) of 2'-hydroxy-5'-(2-amino - 1 - hydroxypropyl)-N-methylmethanesulfonanilide hydrochloride (8.0 g., 0.026 mole) is neutralized by treating with 2.8 ml. (0.026) mole of 9.15 N sodium hydroxide. Precipitated sodium chloride is collected by filtration and the filtrate concentrated in vacuo. The oily residue is taken up in absolute ethanol (100 ml.) and filtered to remove additional sodium chloride. The ethanolic solution is concentrated and the residual oil taken up in 150 ml. of absolute methanol. Phenoxy-2-propanone (7.75 g., 0.052 mole) and 0.8 ml. of glacial acetic acid are added to the methanolic solution which is then subjected to catalytic hydrogenation at room temperature employing 0.7 g. of platinum oxide catalyst and a pressure of approximately 2 atm. After the calculated quantity of hydrogen is absorbed the catalyst is collected by filtration and the filtrate is acidified with ethanolic hydrogen chloride and concentrated in vacuo. The residue is taken up in 50 ml. of 2-propanol and a trace of insoluble white solid separated by filtration. The product, which separates on standing, is collected; 6.87 g., M.P. 210–212° C. (dec.). Crystallization of this product from absolute methanol-isopropyl ether provides analytically pure 2' - hydroxy-5'-[1-hydroxy-2-(1-phenoxy-2-propylamino)propyl] - N - methylmethanesulfonanilide hydrochloride, 4.5 g. (39%), M.P. 220.5–222.5° C. (dec.) (corr.)

Analysis.—Calcd. for $C_{20}H_{29}ClN_2O_5S$ (percent): C, 53.98; H, 6.57; N, 6.30; S, 7.20. Found (percent): C, 53.84; H, 6.67; N, 6.35; S, 7.52.

The foregoing procedure is applicable to the preparation of a large number of additional compounds of the present invention wherein the $R^4$ substituent of Formula I is hydrogen; the $R^5$ substituent of the $NR^4R^5$ group is related to an aldehyde or ketone of structure $R^6$—CO—$R^7$ in that the carbonyl carbon of $R^6$—CO—$R^7$ corresponds to the carbon atom of $R^5$ to which the nitrogen atom is attached.

For example, employing indolyl acetone as the carbonyl compound the $NR^4R^5$ grouping of the resulting products of the present invention would be (3-indolyl)isopropyl amine. Similarly, reductive alkylation with acetone ($R^6$ and $R^7$ equal methyl) provides an N-isopropyl amino phenethylamine.

It is to be understood that the foregoing procedures are illustrative of the preparation of a great number of additional N - (alkyl)alkanesulfonamidophenethanolamines embodied in the present invention. For example, Table III contains a list of phenethanolamines which are obtained by condensation of the phenacyl bromides given in Table II with the appropriate amines and subsequent treatment of the amino ketones as hereinabove exemplified. Representative physical properties of a number of the phenethanolamines of this invention are given in Table IV.

TABLE III

N-(alkyl)alkylsulfonamidophenethanolamines and procedures for the preparation thereof

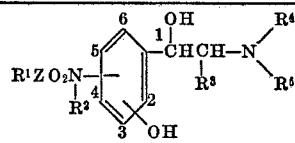

| Example number | Ring position and substituent | | | | | Substituted phenacyl bromide | Amine | Procedures |
|---|---|---|---|---|---|---|---|---|
| | $R^1SO_2NH_2$— | OH | $R^1$ | $R^2$ | $R^3$ | $NR^4R^5$ | | |
| 1 | 4 | 3 | CH₃ | CH₃ | H | NHCH₃ | 2'-benzyloxy-4'-(2-bromoacetyl)-N-methylmethane-sulfonanilide. | N-benzyl-methyl-amine | 6, 8 |
| 2 | 3 | 4 | CH₃ | n-C₄H₉ | H | NHCH₃ | 2'-benzyloxy-5'-(2-bromoacetyl)-N-butylmethane-sulfonanilide. | ……do…… | 6, 8 |
| 3 | 3 | 4 | CH₃ | CH₃ | CH₃ | NH₂ | 2'-benzyloxy-5'-(2-bromopropionyl)-N-methylmeth-anesulfonanilide. | 1,1-diphenyl-methyl-amine. | 7, 8 |
| 4 | 3 | 4 | CH₃ | CH₃ | H | NHCH₃ | 2'-benzyloxy-5'-(2-bromoacetyl)-N-methylmethane-sulfonanilide. | N-benzyl-methyl-amine. | 6, 8 |
| 5 | 3 | 5 | CH₃ | CH₃ | C₂H₅ | NHCH(CH₃)₂ | 3'-benzyloxy-5'-(2-bromobutyryl)-N-methylmeth-anesulfonanilide. | N-benzyliso-propyl-amine. | 6, 8 |
| 6 | 3 | 4 | CH₃ | CH₃ | CH₃ | NHCH₃ | 2'-benzyloxy-5'-(2-bromopropionyl)-N-methyl-methanesulfonan-ilide. | N-benzyl-methyl-amine. | 6, 8 |
| 7 | 3 | 4 | CH₃ | CH₃ | CH₃ | NHCH(CH₃)₂ | ……do…… | N-benzyliso-propyl-amine. | 6, 8 |
| 8 | 3 | 4 | CH₃ | CH₃ | CH₃ | NHC(CH₃)₃ | ……do…… | tert.-butyl-amine. | 6, 8 |
| 9 | 3 | 4 | CH₃ | CH₃ | CH₃ | NHCH₂CH=CH₂ | 2'-hydroxy-5'-(2-bromopropi-onyl)-N-methyl-methanesulfonan-ilide. | Allylamine. | 6, 9 |
| 10 | 4 | 3 | CH₃ | CH₃ | H | NHCHCH₂CH₂ (joined) | 2'-hydroxy-4'-(2-bromoacetyl)-N-methylmeth-anesulfoanilide. | N-benzylcy-clopropyl-amine. | 6, 8 |

TABLE III—Continued

| Example number | R¹SO₂NH₂– | OH | R¹ | R² | R³ | NR⁴R⁵ | Substituted phenacyl bromide | Amine | Procedure |
|---|---|---|---|---|---|---|---|---|---|
| 11 | 4 | 3 | n-C₄H₉ | CH₃ | H | NHCH(CH₂)₂ | 2'-benzyloxy-4'-(2-bromoacetyl)-N-methylbutane-sulfonanilide. | N-benzyliso-propyl-amine. | 6, 9 |
| 12 | 3 | 4 | n-C₄H₉ | CH₃ | H | NHCHCH₂CH₂ | 2'-benzyloxy-5'-(2-bromoacetyl)-N-methylbutane-sulfoanilide. | N-benzyl-cyclo-propyl-amine. | 6, 9 |
| 13 | 3 | 4 | CH₃ | CH₃ | H | NHCH(CH₃)₂ | 2'-benzyloxy-5'-(2-bromoacetyl)-N-methyl-methane-sulfonanilide. | 1,1-diphenyl-methyl-amine. | 6, 8, 10 |
| 14 | 3 | 5 | CH₃ | CH₃ | H | NHCHCH₂CH₂ | 3'-benzyloxy-5'-N-methyl-methane-sulfonamido-acetophenone. | N-benzyl-cylcopro-pylamine. | 6, 9 |
| 15 | 3 | 4 | CH₃ | CH₃ | H | NHCH₂CH₂C₆H₅ | 2'-benzyloxy-5'-(2-bromoacetyl)-N-methyl-methane-sulfonanilide. | Phenethyl-amine. | 6, 8 |
| 16 | 3 | 4 | CH₃ | CH₃ | CH₃ | NHCH₂CH₂C₆H₅ | 2'-benzyloxy-5'-(2-bromopropi-onyl)-N-methyl-methane-sulfonanilide. | ...do... | 6, 8 |
| 17 | 3 | 5 | CH₃ | CH₃ | H | NH-n-C₇H₁₅ | 3'benzyloxy-5'-(2-bromoacetyl)-N-methylmeth-anesulfonanilide. | 1,1-diphenyl-methyla-mine. | 6, 8, 10 |
| 18 | 3 | 4 | CH₃ | CH₃ | H | NHCH₂CH₂–⟨C₆H₄⟩–OCH₃ | 2'-benzyloxy-5'-(2-bromopropi-onyl)-N-methyl-methanesulfonan-ilide. | p-Methoxy-phenethyl-amine. | 6, 8 |
| 19 | 3 | 4 | CH₃ | CH₃ | CH₃ | NHCH₂CH₂–⟨C₆H₄⟩–OCH₃ | ...do... | ...do... | 6, 8 |
| 20 | 3 | 4 | CH₃ | CH₃ | CH₃ | NHCH(CH₃)CH₂OC₆H₅ | ...do... | N-benzyl-phenoxyiso-propyla-mine. | 6, 8 |
| 21 | 3 | 4 | n-C₄H₉ | CH₃ | C₂H₅ | N(CH₃)₂ | 2'-benzyloxy-5'-(2-bromobutyryl)-N-methylbutane-sulfonanilide. | Dimethyla-mine. | 6, 8 |
| 22 | 3 | 4 | CH₃ | CH₃ | n-C₃H₇ | morpholino (N⌒O) | 2'-hydroxy-5'-(2-bromovalyryl)-N-methylmeth-anesulfonanilide. | Morpholine | 6, 8 |
| 23 | 3 | 4 | CH₃ | CH₃ | CH₃ | o-methoxyphenylpiperazinyl | 2'-benzyloxy-5'-(2-bromopropionyl)-N-methylmeth-anesulfonanilide. | o-Methoxy-phenylpiper-azine. | 6, 9 |
| 24 | 3 | 4 | CH₃ | CH₃ | H | NHC(CH₃)₂CH₂OH | 2'-benzyloxy-5'-(2-bromoacetyl)-N-methylmethane-sulfonanilide. | 2-amino-2-methyl-1-propanol. | 6, 9 |
| 25 | 3 | 4 | CH₃ | CH₃ | H | NH-adamantane | ...do... | Adamantane-amine. | 6, 8 |
| 26 | 3 | 4 | CH₃ | CH₃ | H | NH–(norbornyl) | ...do... | 2-Norborane-amine. | 6, 8 |
| 27 | 3 | 4 | CH₃ | CH₃ | H | NHCH₂CH₂–⟨C₆H₄⟩–Cl | ...do... | p-Chloro-phenethyl-amine. | 6, 8 |
| 28 | 3 | 4 | CH₃ | CH₃ | CH₃ | NH–CH(CH₃)CO₂H | 2'-benzyloxy-5'-(2-bromopropionyl)-N-methylmeth-anesulfonanilide. | Alanine | 6, 8 |
| 29 | 3 | 5 | CH₃ | CH₃ | H | NH–(cyclohexenyl) | 3'-hydroxy-5'-(2-bromoacetyl)-N-methylmethane-sulfonanilide. | 3-aminocy-clohex-1-ene. | 6, 9 |
| 30 | 4 | 3 | CH₃ | CH₃ | H | thiomorpholino (N⌒S) | 2'-benzyloxy-4'-(2-bromoacetyl)-N-methylmethane-sulfonanilide. | Thiomorpho-line. | 6, 8 |
| 31 | 4 | 3 | n-C₄H₉ | CH₃ | H | NHCH₂–(cyclopropyl) | 2'-benzlyoxy-4'-(2-bromoacetyl)-N-methylbutane-sulfonanilide. | Cyclopropyl-methylamine. | 6, 8 |

TABLE IV

Physical properties of N-(alkyl)alkylsulfonamidophenethanolamines

| Table III Ex. No. | Name | Crystallization solvent [a] | M.P. (° C.) (corr.) | Calcd. C | H | N | S | Cl | Found C | H | N | S | Cl | NMR [b] | Infrared absorption (5% KBr) microns |
|---|---|---|---|---|---|---|---|---|---|---|---|---|---|---|---|
| 3 | 5'-(2-amino-1-hydroxypropyl)-2'-hydroxy-N-methyl-methanesulfonanilide hydrochloride. | IP | 182–185 (dec.) | 42.51 | 6.16 | 9.02 | 10.32 | | 42.59 | 6.19 | 9.24 | 10.32 | | [c] 4.3 | 3.02, 3.2, 3.36, 3.44, 6.28 (doublet), 6.7, 8.5, 8.6, 8.8, 9.7, 10.5, 12.3, 13.2, 10.3, 11.0, 12.0, 13.1, 3.1, 3.3, 6.2, 6.6, 6.9, 7.5, 8.75, 9.4. |
| 4 | 2'-hydroxy-5'-[1-hydroxy-2-(methylamino)ethyl]-N-methylmethanesulfonanilide hydrochloride. | E-IPE | 161–162.5 | | | 9.02 | 10.32 | 11.41 | | | 8.84 | 10.13 | 11.56 | | 7.6, |
| 6 | 2'-hydroxy-5'-[1-hydroxy-2-(methylamino)propyl]-N-methylmethanesulfonanilide hydrochloride. | E | 191.5–195.5 | 44.37 | 6.52 | | 9.87 | | 44.13 | 6.82 | | 9.83 | | [c] 3.8 | 2.99, 3.07, 3.15, 6.6, 7.45, 8.7, 9.4, 10.3, 11.95, 13.1. |
| 7 | 2'-hydroxy-5'-[1-hydroxy-2-(isopropylamino)propyl]-N-methylmethanesulfonanilide p-toluenesulfonate. | M-IPE | 191.5–193.5 | 51.62 | 6.60 | | 13.12 | | 51.56 | 6.46 | | 13.31 | | [d] 3.3 | 2.98, 3.25, 6.2, 6.6, 7.5, 8.3, 8.4, 8.55, 8.75, 8.9, 9.67, 9.9, 10.34, 12.2, 14.6. |
| 8 | 2'-hydroxy-5'-[1-hydroxy-2-(tert-butylamino)ethyl]-N-methylmethanesulfonanilide hydrochloride. | M-IPE | 207–208 | 47.65 | 7.14 | 7.94 | 9.08 | | 47.71 | 7.20 | 7.89 | 8.13 | | | 2.95, 3.1, 3.15, 3.4, 6.2, 6.6, 6.95, 7.25, 7.55, 8.78, 10.5, 12.2, 13.1. |
| 15 | 2'-hydroxy-5'-[1-hydroxy-2-(phenethylamino)ethyl]-N-methylmethanesulfonanilide hydrochloride. | M-IPE | 208.5–209.5 | 53.92 | 6.28 | | 8.00 | | 53.86 | 6.58 | | 8.13 | | | 3.0, 6.61, 7.5, 8.75, 9.42, 10.37, 12.1, 13.1, 14.3. |
| 16 | 2'-Hydroxy-5'-[1-hydroxy-2-(phenethylamino)propyl]-N-methylmethanesulfonanilide hydrochloride. | M-IPE | 231–232 | 54.99 | 6.66 | 6.75 | 7.73 | | 54.99 | 6.44 | 6.98 | 7.76 | | [d] 35 | 2.95, 6.61, 7.55, 8.75, 10.3, 12.1, 13.1, 14.25. |
| 18 | 2'-hydroxy-5'-[1-hydroxy-2-(p-methoxyphenylamino)ethyl]-N-methylmethanesulfonanilide hydrochloride. | M-IPE | 194.5–196 (dec.) | 52.95 | 6.32 | 6.50 | | | 53.11 | 6.68 | 6.46 | | | | 2.93, 3.1, 3.35, 6.2, 6.57, 7.5, 8.0, 8.7, 9.65, 10.3, 12.05, 13.05. |
| 19 | 2'-hydroxy-5'-[1-hydroxy-2-(p-methoxyphenethylamino)propyl]-N-methylmethanesulfonanilide hydrochloride. | M-IPE | 204–205 | 53.98 | 6.57 | 6.30 | 7.20 | | 53.87 | 6.79 | 6.28 | 7.39 | | [c] 3.9 | 2.95, 3.4, 6.2, 6.6, 7.54, 8.0, 8.73, 10.3, 12.05, 13.05. |
| 20 | 2'-hydroxy-5'-[1-hydroxy-2-(1-phenoxy-2-propylamino)propyl]-N-methylmethanesulfonanilide hydrochloride. | M-IPE | 220.5–222.5 (dec.) | 53.98 | 6.57 | | 7.20 | | 53.77 | 6.62 | | 7.13 | | [d] 3.4 | 3.05, 3.15, 6.3 (doublet), 6.65 (doublet), 7.5, 8.05, 8.7, 9.4, 10.33, 12.1, 13.1, 14.42. |
| 1 | 2'-hydroxy-4'-(1-hydroxy-2-methylaminoethyl)-N-methylmethanesulfonanilide hydrochloride. | IP-IPE | 199.5–204 (dec.) | 42.51 | 6.16 | | 10.31 | | 42.43 | 6.07 | | 10.15 | | | 2.99, 3.10, 3.28, 3.6, 6.9, 7.1, 8.78, 9.42, 10.32, 11.09, 13.45. |

[a] IP=2-propanol; IPE=isopropylether; E=ethanol; M=methanol.  [b] Coupling constant $J_{H_1,H_2}$.  [c] $D_2O$.  [d] $CF_3CO_2H$.

What is claimed is:

1. A compound selected from the group consisting of the substances of Formula I

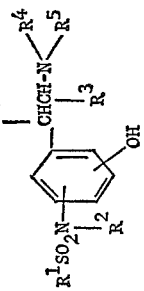

Formula I and the pharmaceutically acceptable acid addition salts thereof wherein the $R^1SO_2NR_2$— and OH functionalities are joined to the benzene ring in any of the 3, 4, and 5 ring position relative to the

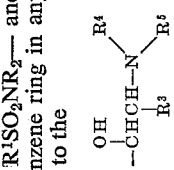

side chain and wherein $R^1$ and $R^2$ are independently selected lower alkyl groups of from 1 through 4 carbon atoms;

$R^3$ is selected from the group consisting of hydrogen, lower alkyl of from 1 through 3 carbon atoms;

$R^4$ is selected from the group consisting of hydrogen, alkyl up to 10 carbon atoms, benzyl, and benzhydryl; and $R^5$ is selected from the group consisting of adamantyl, alaninyl, 2-norbornyl, 2 - amino - methylenebicyclo-(2.2.1)-5-heptyl, 1-methoxyisopropyl, 1-(3,4-methylenedioxyphenyl) - 2 - propyl, beta-hydroxyphenethyl, 1-hydroxy-2-methylisopropyl, hydrogen, and a hydrocarbon group including alkyl, alkenyl, cycloalkyl, cycloalkenyl, cycloalkylalkyl, phenylalkyl, phenylalkenyl, phenoxyalkyl, wherein each of said hydrocarbon groups contain up to 12 carbon atoms and each of said phenylalkyl and phenoxyalkyl has zero to one substituent attached to the phenyl portion selected from the group consisting of halogen and lower alkoxy up to 4 carbon atoms, wherein one of $R^4$ and $R^5$ is hydrogen when the other is not.

2. A compound as claimed in claim 1 wherein the $R^1SO_2NR^2$— and OH groups are respectively joined to the aromatic ring in the 3 and 4 positions relative to the

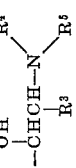

side chain.

3. The compound of claim 1 wherein $R^1$ and $R^2$ are lower alkyl groups of from 1 through 4 carbon atoms, $R^3$ is lower alkyl of from 1 through 3 carbon atoms, $R^4$ is hydrogen, and $R^5$ is phenoxy alkyl.

4. The compound of claim 1 identified by the chemical name 2'-hydroxy-5'-[1-hydroxy-2-(1-phenoxy - 2 - propylamino)propyl]-N-methylmethanesulfonanilide.

5. The compound of claim 1 identified by the chemical name 2'-hydroxy-5'-[1-hydroxy-2-(1-phenoxy - 2 - propylamino)propyl]-N-methylmethanesulfonanilide hydrochloride.

6. The compound of claim 1 identified by the chemical name 2'-hydroxy-4'-(1-hydroxy - 2 - methylaminoethyl)-N-methylmethanesulfonanilide.

7. The compound of claim 1 identified by the chemical name 2'-hydroxy-4'-(1-hydroxy - 2 - methylaminoethyl)-N-methylmethanesulfonanilide hydrochloride.

8. The compound of claim 1 identified by the chemical name 5'-(2-amino - 1 - hydroxypropyl) - 2' - hydroxy-N-methylmethanesulfonanilide.

9. The compound of claim 1 identified by the chemical name 5'-(2-amino - 1 - hydroxypropyl) - 2' - hydroxy-N-methylmethanesulfonanilide hydrochloride.

10. The compound of claim 1 identified by the chemical name 2'-hydroxy-5'-[1-hydroxy - 2 - (methylamino)ethyl]-N-methylmethanesulfonanilide.

11. The compound of claim 1 identified by the chemical name 2'-hydroxy-5'-[1-hydroxy - 2 - (methylamino)ethyl]-N-methylmethanesulfonanilide hydrochloride.

12. The compound of claim 1 identified by the chemical name 2'-hydroxy-5'-[1 - hydroxy-2-(methylaminopropyl]-N-methylmethanesulfonanilide.

13. The compound of claim 1 identified by the chemical name 2'-hydroxy-5'-[1 - hydroxy-2-(methylaminopropyl]-N-methylmethanesulfonanilide hydrochloride.

14. The compound of claim 1 identified by the chemical name 2'-hydroxy-5'-[1-hydroxy - 2 - (isopropylamino)propyl]-N-methylmethanesulfonanilide.

15. The compound of claim 1 identified by the chemical name 2'-hydroxy-5'-[1-hydroxy - 2 - (isopropylamino)propyl]-N-methylmethanesulfonanilide p-toluenesulfonate.

16. The compound of claim 1 identified by the chemical name 2'-hydroxy-5'-[1 - hydroxy - 2 - (tert.-butylamino)ethyl]-N-methylmethanesulfonanilide.

17. The compound of claim 1 identified by the chemical name 2'-hydroxy-5'-[1 - hydroxy - 2 - (tert.-butylamino)ethyl]-N-methylmethanesulfonanilide hydrochloride.

18. The compound of claim 1 identified by the chemical name 2'-hydroxy-5'-[1 - hydroxy - 2 - (phenethylamino)-ethyl]-N-methylmethanesulfonanilide.

19. The compound of claim 1 identified by the chemical name 2'-hydroxy-5'-[1 - hydroxy - 2 - (phenethylamino)-ethyl]-N-methylmethanesulfonanilide hydrochloride.

20. The compound of claim 1 identified by the chemical name 2'-hydroxy-5'-[1 - hydroxy - 2 - (phenethylamino)propyl]-N-methylmethanesulfonanilide.

21. The compound of claim 1 identified by the chemical name 2'-hydroxy-5'-[1 - hydroxy - 2 - (phenethylamino)propyl]-N-methylmethanesulfonanilide hydrochloride.

22. The compound of claim 1 identified by the chemical name 2'-hydroxy-5'-[1-hydroxy - 2 - (p-methoxyphenethylamino)ethyl]-N-methylmethanesulfonanilide.

23. The compound of claim 1 identified by the chemical name 2'-hydroxy-5'-[1-hydroxy - 2 - (p-methoxyphenethylamino)ethyl]-N-methylmethanesulfonanilide hydrochloride.

24. The compound of claim 1 identified by the chemical name 2'-hydroxy-5'-[1-hydroxy - 2 - (p-methoxyphenethylamino)propyl]-N-methylmethanesulfonanilide.

25. The compound of claim 1 identified by the chemical name 2'-hydroxy-5'-[1-hydroxy - 2 - (p-methoxyphenethylamino)propyl] - N - methylmethanesulfonanilide hydrochloride.

26. The compound of claim 1 identified by the chemical name 2'-hydroxy-5'-(1 - hydroxy - 2 - isopropylaminoethyl)-N-methylmethanesulfonanilide.

27. The compound of claim 1 identified by the chemical name 2'-hydroxy-5'-(1 - hydroxy - 2 - isopropylaminoethyl)-N-methylmethanesulfonanilide acetate.

References Cited

UNITED STATES PATENTS

| | | | |
|---|---|---|---|
| 2,075,359 | 3/1937 | Salzberg et al. | 424—250 |
| 3,341,584 | 9/1967 | Larsen et al. | 260—556 A |
| 3,472,843 | 10/1969 | Skorcz et al. | 260—556 A |

OTHER REFERENCES

J. Med. Chem., vol. 10, pp. 462–72 (1967), Larsen et al.
J. Med. Chem., vol. 9, pp. 88–96 (1966), Uloth et al.

HENRY R. JILES, Primary Examiner

S. D. WINTERS, Assistant Examiner

U.S. Cl. X.R.

260—243 B, 247.1, 268 PH, 521 R, 544 M, 592; 424—246, 248, 250 321

UNITED STATES PATENT OFFICE
CERTIFICATE OF CORRECTION

Patent No. 3,660,487               Dated May 2, 1972

Inventor(s) AUBREY A. LARSEN and ROBERT H. ULOTH

It is certified that error appears in the above-identified patent and that said Letters Patent are hereby corrected as shown below:

Col. 2, l. 16        -    Under the formula insert
                              -- Formula I --

Col. 3, l. 11        -    After comma(,) (first occurrence)
                            insert a space before the word
                            "alanine"

Col. 4, ll. 2 & 3 -       After "chlo-" at end of line 2, insert
                            rest of word -- rine, bromine, iodine,
                            fluorine, sulfate, phosphate, or --

Col. 4, l. 13        -    "hdride" should be "hydride"

Col. 4, l. 14        -    Before the "l" insert -- y --

Col. 6, l. 12        -    "ethaol" should be "ethanol"

Col. 6, l. 46        -    "Gifty" should be "Fifty"

Col. 6, Table I
   First Line       -     There should not be a space between
                            "alkane" and "sulfonamidophenethanol-"

Col. 7, l. 75        -    "hydroxhloride" should be "hydrochloride"

Page Two

REQUEST FOR CERTIFICATE OF CORRECTION

Patent No. 3,660,487

Dated: May 2, 1972

Inventor(s): Aubrey A. Larsen and Robert H. Uloth

---

Col. 8, l. 44 — "chloroprophenpyridamine" should be "chlorprophenpyridamine"

Col. 8, l. 46 — "phosprate" should be "phosphate"

Col. 9, l. 6 — "surfuric" should be "sulfuric"

Col. 9, l. 36 — "than" should be "then"

Col. 10, Table II - Under Col. II — "Benzyl-acyl-(N-" should be "Benzyloxy-acyl-(N-"

Col. 10, Table II
Under Col. 1
Formula 5, l. 2 — Before "butanesulfon-" insert -- n- --

Col. 12, l. 13 — Before "2" insert -- [ --

Col. 12, l. 31 — "methanesulfonilide" should be "methanesulfonanilide"

Col. 13, l. 2 — After "0.08" insert the word -- mole --

Table III, Cols. 13 and 14
In the Formula — "$R^1ZO_2N-$" should be "$R^1SO_2N-$"

Page Three

REQUEST FOR CERTIFICATE OF CORRECTION

Patent No. 3,660,487

Dated: May 2, 1972

Inventor(s): Aubrey A. Larsen and Robert H. Uloth

---

Table III
Cols. 15 and 16
Under "Substituted
Phenacyl bromide"
Example 17               - After "3'" insert a dash -- - --

Table III
Cols. 15 and 16
Under "Substituted
Phenacyl bromide"
Example 29               - " -5-' " should be " -5'- "

Table III
Cols. 15 and 16
Under "Substituted
Phenacyl bromide"
Example 31, l. 1         - "benzlyoxy" should be "benzyloxy"

Table III
Cols. 15 and 16
Under "Amine"
Example 31, l. 3         - delete the last "amine"

Table IV
Col. 17
Caption: "Analysis
(percent by weight"      - After "weight" insert closing
                           parenthesis " ) "

Page Four

REQUEST FOR CERTIFICATE OF CORRECTION

Patent No. 3,660,487

Dated: May 2, 1972

Inventor(s): Aubrey A. Larsen and Robert H. Uloth

---

Table IV
Under M.P. (°C.)
Example 4           -   After "161 - 162.5" insert
                                -- (dec.) --

Table IV
Under M.P. (°C.)
Example 8           -   After "207 - 208" insert
                                -- (dec.) --

Table IV
Under "Name"
Example 18          -   "(p-methoxypheneylamino)"
                            should be
                            "(p-methoxyphenethylamino)"

<u>IN THE CLAIMS</u>

Claim 12, l. 2       -   "(methylaminopropyl]-" should be
                            "(methylamino)propyl]-"

Claim 13, l. 2       -   "(methylaminopropyl]-" should be
                            "(methylamino)propyl]-"

Signed and sealed this 27th day of March 1973.

(SEAL)
Attest:

EDWARD M. FLETCHER, JR.             ROBERT GOTTSCHALK
Attesting Officer                    Commissioner of Patents